(12) United States Patent
Jin et al.

(10) Patent No.: US 12,055,410 B2
(45) Date of Patent: Aug. 6, 2024

(54) METHOD FOR GENERATING ROAD MAP FOR AUTONOMOUS VEHICLE NAVIGATION

(71) Applicant: WeRide Corp., Sunnyvale, CA (US)

(72) Inventors: Qiu Jin, Sunnyvale, CA (US); Yiqing Yang, Sunnyvale, CA (US); Huan Chen, Sunnyvale, CA (US); Chao Lin, Sunnyvale, CA (US); Chunlei Meng, Sunnyvale, CA (US)

(73) Assignee: WERIDE CORP., Sunnyvale, CA (US)

( * ) Notice: Subject to any disclaimer, the term of this patent is extended or adjusted under 35 U.S.C. 154(b) by 420 days.

(21) Appl. No.: 16/899,561

(22) Filed: Jun. 11, 2020

(65) Prior Publication Data
US 2020/0393253 A1    Dec. 17, 2020

Related U.S. Application Data

(60) Provisional application No. 62/859,723, filed on Jun. 11, 2019.

(51) Int. Cl.
| | |
|---|---|
| *G01C 21/00* | (2006.01) |
| *G01C 21/34* | (2006.01) |
| *G06V 10/82* | (2022.01) |
| *G06V 20/56* | (2022.01) |
| *G06V 30/19* | (2022.01) |
| *G06V 30/422* | (2022.01) |

(52) U.S. Cl.
CPC ..... *G01C 21/3815* (2020.08); *G01C 21/3492* (2013.01); *G06V 10/82* (2022.01); *G06V 20/588* (2022.01); *G06V 30/19173* (2022.01); *G06V 30/422* (2022.01)

(58) Field of Classification Search
CPC ............... G01C 21/32; G01C 21/3492; G01C 21/3815; G01C 10/82; G06V 20/588; G06V 30/422; G06V 10/82; G06K 9/6271
See application file for complete search history.

(56) References Cited

U.S. PATENT DOCUMENTS

| | | | |
|---|---|---|---|
| 2017/0016734 A1* | 1/2017 | Gupta | B60W 30/00 |
| 2017/0221366 A1* | 8/2017 | An | G08G 1/096758 |
| 2018/0150080 A1* | 5/2018 | Gross | G05D 1/0217 |
| 2018/0189578 A1* | 7/2018 | Yang | G01C 21/32 |
| 2019/0033871 A1* | 1/2019 | Lee | G06V 20/588 |
| 2020/0341466 A1* | 10/2020 | Pham | G05D 1/0083 |
| 2021/0370968 A1* | 12/2021 | Xiao | G01S 17/931 |

* cited by examiner

*Primary Examiner* — Abby J Flynn
*Assistant Examiner* — Daniel Tyler Reich
(74) *Attorney, Agent, or Firm* — Jun He Law Offices P.C; James J. Zhu

(57) ABSTRACT

A method for generating a road map for vehicle navigation comprises: receiving an original road map having a crossroad junction, an inward lane entering the crossroad junction, and an outward lane leaving the crossroad junction; generating a reference path capable of guiding a vehicle driving from the inward lane to the outward lane through the crossroad junction; generating a polygonal hub that encompasses the crossroad junction, wherein the reference path enters and leaves the hub by crossing a first binder and a second binder, respectively; and generating automatically a type of the reference path based on the geometrical relationship between the first binder and the second binder.

17 Claims, 6 Drawing Sheets

METHOD FOR GENERATING ROAD MAP FOR AUTONOMOUS VEHICLE NAVIGATION

TECHNICAL FIELD

The application generally relates to navigation and digital mapping technologies, and more particularly, to a method for generating a detailed machine-readable road map for navigation system of autonomous driving.

BACKGROUND

Autonomous vehicles need to make real-time decisions on roads. While robots have the capability to do some things more efficiently than humans, the real-time decision-making capability, when it comes to driving and navigation, is one of those key areas that human still have the edge. For example, humans take it for granted to make such decisions as stopping the vehicle at the right place, watching for a traffic signal at the intersection, and avoiding an obstacle on the road in the last minute. These decisions, however, are very difficult for robots to make. As part of the decision-making process for autonomous vehicles, mapping becomes a critical component of helping the robots make the right decisions at the right time.

Autonomous vehicles use high definition (HD) vector maps or semantic maps that contain a huge amount of driving assistance information. In particular, an HD vector map contains numerous navigation information, such as traffic control indications, the speed limit of a lane and where a left turn begins. More importantly, these navigation information needs to be correctly associated with reference paths that guide the navigation of an autonomous vehicle. The process of linking the navigation information of reference paths is not intuitive and takes a tremendous amount of effort. Therefore, there is an urgent need for new methods for making HD vector maps for autonomous driving.

SUMMARY

An objective of the application is to provide a method for generating and using a digital road map which contains navigation information useful for autonomous driving.

In a first aspect of the application, there is provided a method for generating a high definition map for vehicle navigation. In one embodiment, the method comprises: obtaining an original road map having crossroad junction, an inward lane entering the crossroad junction, and an outward lane leaving the crossroad junction; generating a reference path capable of guiding a vehicle driving from the inward lane to the outward lane through the crossroad junction; generating a polygonal hub that encompasses the crossroad junction, wherein the reference path enters and leaves the hub by crossing a first binder and a second binder, respectively; and generating automatically a type of the reference path based on the geometrical relationship between the first binder and the second binder.

In another aspect of the application, there is provided a computer readable storage medium for storing a program of instructions executable by a computer to perform a process. In one embodiment, the process comprises: obtaining an HD vector map for vehicle navigation generated according to the method of claim 1; obtaining a present position of a vehicle; obtaining a destination of the vehicle; and calculating a route for the vehicle based on the HD vector map, the present position of the vehicle and the destination of the vehicle.

The foregoing has outlined, rather broadly, features of the present application. Additional features of the present application will be described, hereinafter, which form the subject of the claims of the present application. It should be appreciated by those skilled in the art that the conception and specific embodiments disclosed herein may be readily utilized as a basis for modifying or designing other structures or processes for carrying out the objectives of the present application. It should also be realized by those skilled in the art that such equivalent constructions do not depart from the spirit and scope of the present application as set forth in the appended claims.

BRIEF DESCRIPTION OF THE DRAWINGS

The aforementioned features and other features of the present application will be further described in the following paragraphs by referring to the accompanying drawings and the appended claims. It will be understood that, these accompanying drawings merely illustrate certain embodiments in accordance with the present application and should not be considered as limitation to the scope of the present application. Unless otherwise specified, the accompanying drawings need not be proportional, and similar reference characters generally denote similar elements.

DETAILED DESCRIPTION

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure.

Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

The present disclosure relates to methods and systems for generating high definition maps, e.g., used in autonomous driving. For the sake of brevity, conventional techniques and components related to the autonomous driving technology and other functional aspects of the system (and the individual operating components of the system) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

High Definition Map and Autonomous Driving System

Figure 1:
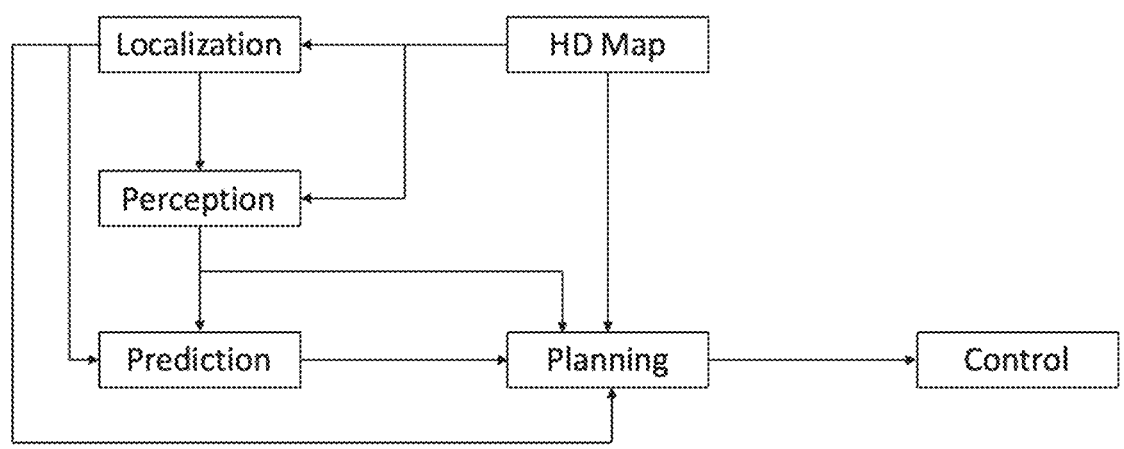
FIG. 1 illustrates an exemplary autonomous driving system.

Autonomous vehicles (also known as driverless cars, self-driving cars or robot cars) are capable of sensing its environment and navigating without human input. Autonomous vehicle is a complex system integrating many technologies that coordinate to fulfill the challenging task of controlling a vehicle without human input. FIG. 1 illustrates an exemplary autonomous vehicle system that comprises functional subsystems, or modules, that work collaboratively to generate signals for controlling a vehicle.

Referring to FIG. 1, an autonomous vehicle system includes a high definition (HD) vector map that the autonomous vehicle can use to plan its path. An HD vector map used by an autonomous vehicle contains a huge amount of driving assistance information. The most important information is the accurate 2-dimensional or 3-dimensional representation of the road network, such as the layout of the intersection and location of signposts. The HD vector map also contains a lot of semantic information, such as what the color of traffic lights means, the speed limit of a lane and where a left turn begins. One of the major differences between an HD vector map and a traditional map is the precision—while a traditional map typically has a meter-level precision, the HD vector map requires a centimeter level precision in order to ensure the safety of an autonomous vehicle. The HD vector map dataset may be stored in the autonomous vehicle. Alternatively, the HD vector map dataset is stored and updated in a server (e.g., a cloud) that communicates with the autonomous vehicle and provides the map information necessary for the autonomous vehicle to use.

The information in the HD vector map is used by many other modules of the autonomous driving system. In the first place, a localization module depends on the HD vector map to determine the exact location of the autonomous vehicle. The BD vector map also helps a perception module to sense the environment around the autonomous vehicle when the surrounding area is out of the range of the sensors or blocked by an obstacle. The HD vector map also helps a planning module to find suitable driving space and to identify multiple driving routes. The HD vector map allows the planning module to accurately plan a path and choose the best maneuver.

A localization module of the autonomous driving system helps an autonomous vehicle to know where exactly it is, which is a challenging task because any single sensor or instrument currently available, such as GPS and IMU, is insufficient to provide location information accurately enough for autonomous driving. Current localization technology uses information gathered by the sensors installed in the autonomous vehicle to identify landmarks in the surrounding environment and determines the location of the autonomous vehicle relative to the landmarks. The localization module then compares the landmarks identified by the sensors to the corresponding landmarks in the HD vector map, thereby determining the exact location of the autonomous vehicle in the map. Typically, to ensure a localization of high precision required by autonomous driving, a localization module combines information collected by multiple sensors using different localization techniques, such as GNSS RTK (Global Navigation Satellite System Real-time Kinematics) used by GPS, inertial navigation used by IMU, LiDAR localization and visual localization.

A perception module of the autonomous driving system is configured to sense the surrounding of the autonomous vehicle using sensors such as camera, radar and LiDAR and to identify the objects around the autonomous vehicle. The sensor data generated by the sensors are interpreted by the perception module to perform different perception tasks, such as classification, detection, tracking and segmentation. Machine learning technologies, such as convolutional neural networks, have been used to interpret the sensor data. Technologies such as Kalman filter have been used to fuse the sensor data generated by different sensors for the purposes of accurate perception and interpretation.

Many of the objects around the autonomous vehicle are also moving. Therefore, a prediction module of the autonomous driving system is configured to predict the behavior of these moving objects in order for the autonomous vehicle to plan its path. Typically, the prediction module predicts the behavior of a moving object by generating a trajectory of the object. The collection of the trajectories of all the objects around the autonomous vehicle forms a prediction of a timestep. For each timestep, the prediction module recalculates the prediction for every moving object around the autonomous vehicle. These predictions inform the autonomous vehicle to determine its path.

A planning module of the autonomous driving system incorporates the data from the HD vector map module, localization module and prediction module to generates a trajectory for the vehicle. The first step of planning is route navigation that generates a navigable path. Once a high-level route is built, the planning module zooms into trajectory planning, which makes subtle decisions to avoid obstacles and creates a smooth ride for the passengers, i.e., to generate a collision-free and comfortable trajectory to execute.

The trajectory generated in the planning module is then executed by a control module to generates a series of control inputs including steering, acceleration and/or braking. Several conditions need be considered by the control module when generating control inputs. First, the controller needs to be accurate so that the result avoids deviation from the target trajectory, which is important for safety. Second, the control strategy should be feasible for the car. Third, comfortable driving is important for the passenger. Hence the actuation should be continuous and avoid sudden steering, acceleration or braking. In sum, the goal of the controlling module is to use viable control inputs to minimize deviation from the target trajectory and maximize passenger comfort.

Therefore, an HD vector map, which provides necessary information for localization module, perception module and planning module, is the foundation of an autonomous driving system. In certain embodiments, the navigation information of an HD vector map is supplied to other modules of an autonomous driving system in the form of waypoints. Each waypoint contains information such as lane geometry with lane boundaries, lane type and direction, lane speed limit, left/right lane segment, along with critical traffic control information and associated critical traffic zones (e.g., crosswalk and etc.). In certain embodiments, depending on the location of the autonomous vehicle, only waypoints near the autonomous vehicle, e.g., within the range of 200-300 meters, are provided. The autonomous driving system then uses the waypoints in conjunction with the sensory information to localize the vehicle, percept the environment, and plan the path and control the motion.

Typically, waypoints are connected to form reference path to which the motion of the autonomous vehicle follows. For example, the waypoints in certain embodiments may locate in the center of each lane and form a reference path in the centerline of the lane. In certain circumstances, however, for example in road connection regions, reference path and the navigation information linked to the waypoints may be complicated and not intuitive. As a result, it takes a lot effort and labor to generate an HD vector map that contains sufficient navigation information for autonomous driving. Therefore, the present disclosure in one aspect provides methods of generating an HD vector map for autonomous vehicle navigation.

Methods of Generating HD Vector Map

The invention disclosed in the present application may be understood through the following exemplary embodiments and the accompanying drawings. The invention disclosed in the present application may also be understood in view of the disclosure of U.S. patent application Ser. No. 16/359,991, titled "method for generating road map for vehicle navigation and navigation device," which is incorporated herein by reference. Unless otherwise stated in the context, similar symbols generally represent similar components in the accompanying figures. The illustrative embodiments in the following detailed description, the accompanying drawings and the claims are not limiting, and other embodiments may be adopted, or modifications may be made without deviating from the spirit and subject of the application. It should be understood that, the various aspects of the application described and graphically presented herein may be arranged, replaced, combined, divided and designed in many different configurations, and these different configurations are implicitly included in the application.

Figure 2:
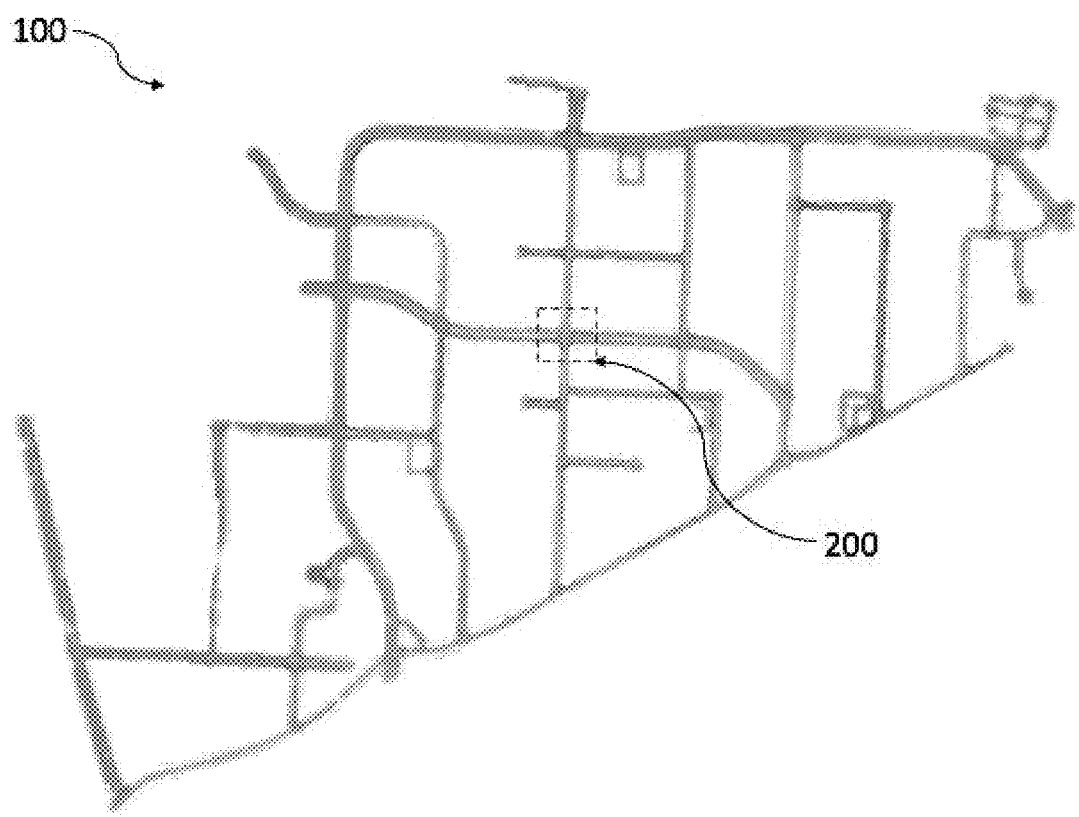
FIG. 2 illustrates an exemplary original road map.

FIG. 2 illustrates an exemplary original road map based on which an HD vector map of the present disclosure can be generated. As shown in FIG. 2, the original road map 100 stored as a digital format contains an image of a road network within a specific geographical area or territory. The road network may have several roads and a background of the roads such as houses, lands, rivers or the like. In some embodiments, the original road map can be generated from sensor data, for example, captured by sensors such as LiDAR (Light Detection and Ranging) sensors, radar sensors, cameras or any other suitable types of sensors. The original road map 100 further contains road connection regions. In particular, the original road map 100 contains a road connection region 200, which is illustrated in detail in FIG. 3. Now referring to FIG. 3, the road connection region 200 contains multiple roads connected at a crossroad junction 250. The roads connected at the crossroad junction 250 contain certain lanes entering the crossroad junction 250 and certain lanes leaving the crossroad junction 250. In particular, lanes 211, 212, 221, 222, 231, 232, 241 and 242 enter the crossroad junction 250. Lanes 213, 214, 223, 224, 233, 234, 243 and 244 leave the crossroad junction 250. The road connection region 200 further contains traffic control regions and indications, for example, cross walk regions 261, 262, 263 and 264, stop line 271, and traffic light 281.

Figure 3:
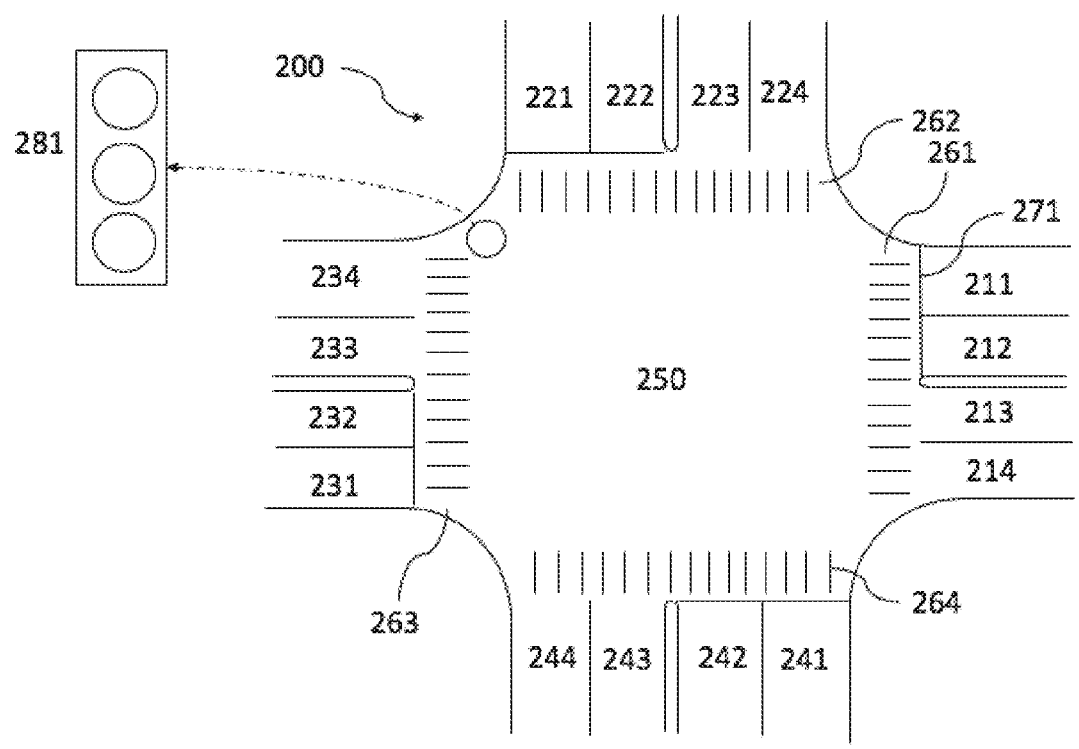
FIG. 3 illustrate a road connection region in the road map illustrated in FIG. 2.

The following embodiment illustrate an exemplary process of generating an HD vector map for vehicle navigation based on the original road map shown in FIGS. 2 and 3. It will be readily appreciated by those skilled in the art that the size of an HD vector map generated may vary depending on the size of the original road map. And in some examples, the original road map may be divided into several portions which can be processed separately and combined together afterwards. Moreover, an HD vector map generated is a vector map which includes vector-based collections of geographic information system (GIS) data about a place at various levels of detail. For example, the HD vector map may contain various hubs or junctions connected by lanes in form of a tree structure consisting of nodes connected by edges. In some embodiments, the tree-structure vector map facilitates routing planning and navigation by using various graph searching algorithms.

Figure 4:
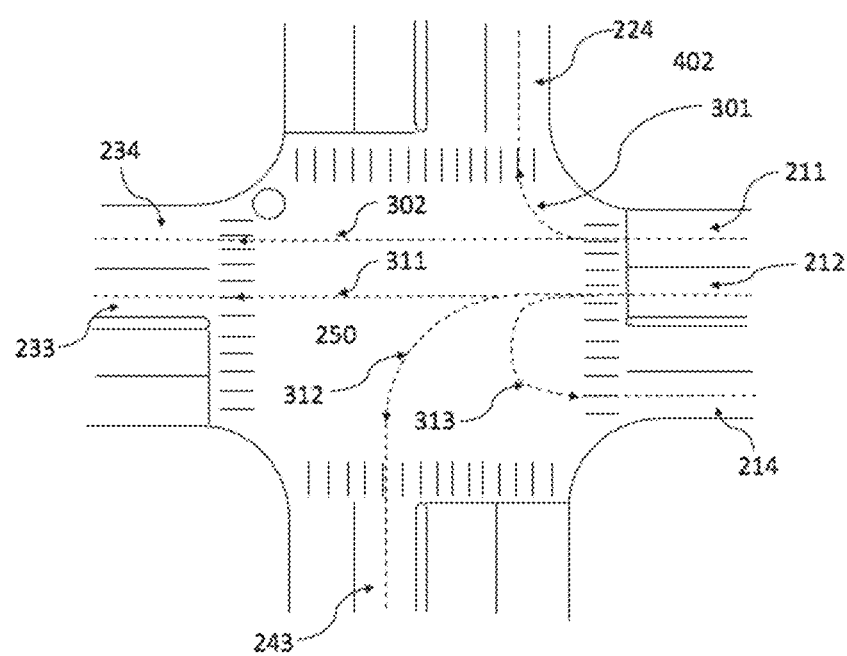
FIG. 4 illustrates the generation of reference paths based on the road connection region illustrated in FIG. 3.
Figure 5:
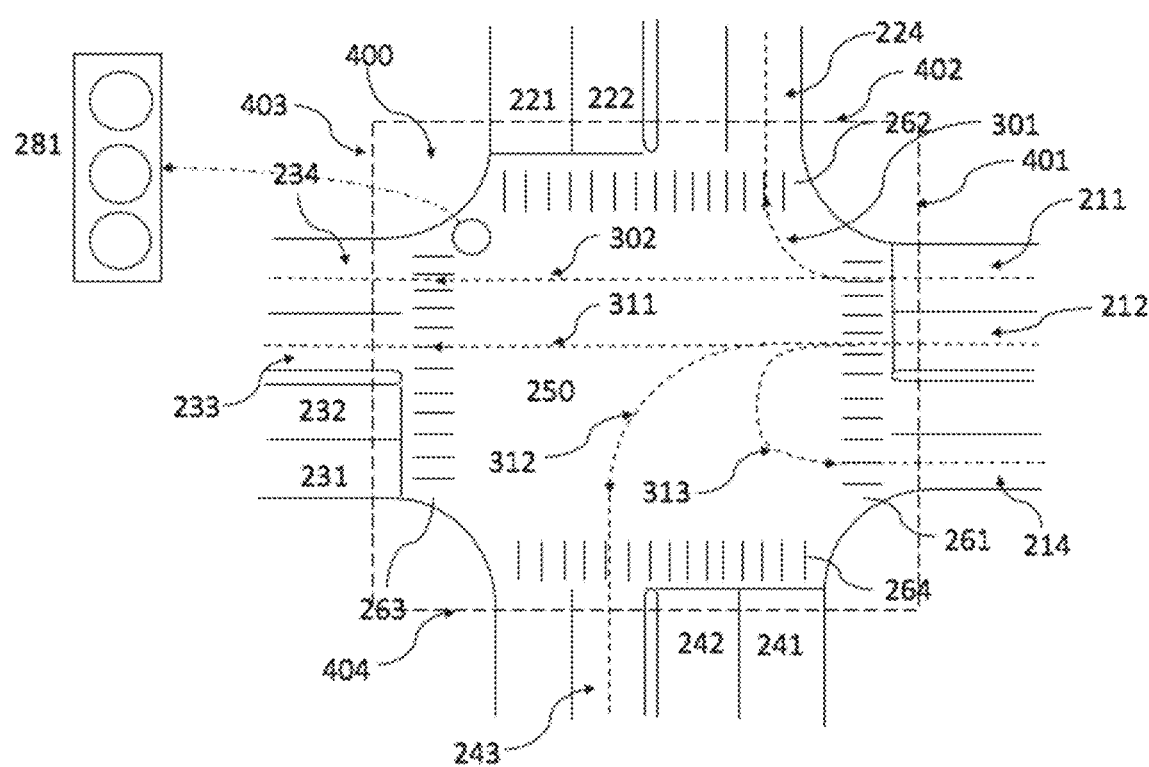
FIG. 5 illustrates the association of related navigation information and traffic control indication to the reference paths as illustrated in FIG. 4.

The generation of an HD vector map that contains the road connection region 200 from the original road map 100 can be understood in the exemplary embodiments illustrated in FIGS. 4 and 5. It should be noted that the description below relating to the generation of HD vector map is exemplary, and in practice the generation of HD vector maps can be based on regions other than the junction regions, e.g. based on road regions, which is generally easier due to simplicity of the inside layout of the road regions.

In the first step to generate the HD vector map of the present disclosure, reference paths including waypoints are generated based on the original road map. In certain embodiments, to generate a reference path in a lane, boundary lines that define certain boundaries of the lane are identified and labeled based on the original road map. For example, some boundary lines follow respective curbs of the roads, which separate drive regions and non-drive regions. In some examples, the non-drive regions may be sidewalks, bikeways, yards, buildings or houses aside of the drive regions that vehicles generally cannot drive into or drive through. In certain embodiments, some boundary lines define the lane separators that divide the road into different driving lanes. It can be understood that some roads may have only one driving lane, and thus the boundary lines that separate the lanes may not be identified for such roads. In such case, the boundary lines that define the road also define the driving lane. Additional boundary lines may define central separation belts, lines or greenbelts of the roads, which separate two ways of the roads; fences that separate the roads/lanes, island boundaries, etc.

In certain embodiments, the boundary lines may be identified or labelled automatically by processing the original road map with certain image recognition algorithm. As used herein, the term "automatically" when used in the context of identification, labeling or generation of objects or linkages in an HD vector map means the identification, labeling or generation is performed by a computer processor without substantial human input. For example, the original road map may include original lane separation lines, and thus the lane boundaries can follow these original lane separation lines using an image recognition algorithm. In some cases where the original lane separation lines are not provided in the original road map, the lane boundaries may be identified based on the boundary lines and traffic rules. For example, a distance between two parallel boundary lines defining a drive region may be 15 meters and a minimum lane width in accordance with the traffic rules is 4 meters, then three driving lane may be identified, which have lane widths of 5.2 meters, 4.6 meters and 5.2 meters, respectively, for example. And corresponding lane boundaries are added to the road map. In certain embodiments, the boundary lines may be labelled by human operations. In some examples, a computer processing the road map receives instruction from a human being to add the identified boundary lines into the road map.

In certain embodiments, the reference path is linked with navigation information related to traffic properties. The navigation information to be linked may include lane width, lane's hard/soft boundaries (i.e., whether a vehicle is allowed to pass through the lane boundary) and speed limit, etc. In certain embodiments, the navigation information is linked with the waypoints contained in the reference path such that an autonomous vehicle can use the waypoints in conjunction with the sensory information to plan the path and control the motion. In certain embodiment, waypoints are set in every about 0.5 or more meters in the reference path. In certain embodiments, the navigation information linked with reference path or waypoints may include traffic property such as "pass through prohibited" which prohibits a vehicle from changing lanes, or a traffic property "pass through permitted" which permits a vehicle to change lane. In certain embodiments, the navigation information linked with reference path or waypoints may include specific speed limits such as a maximum speed or a minimum speed. In certain embodiments, the navigation information linked with reference path or waypoints may include a traffic property which permits driving of a car but prohibits driving of a truck. As such, different types of vehicles may use such navigation information differently. In certain embodiments, the navigation information associated with reference path or waypoints may include a specific turn direction (e.g. left, straight, right or U-turn) that a vehicle may take. It can be readily appreciated that other traffic properties can be associated, such as railway, etc. with the reference path or waypoints.

In certain embodiments, the traffic property of the waypoint can be provided with certain algorithms. For example, a way point in the outward lane may be associated with traffic property "left turn" when a physical left turn sign in the outward lane is identified by an image recognition algorithm. In some embodiments, the traffic property of the waypoint can be added and associated with the waypoint through human operation.

In road connection regions where different lanes are connected, the reference paths of the lanes are linked to generate complete and continuous reference path. In the context of generating reference path in a crossroad junction, lanes that connect at the crossroad junction can be categorized into two groups: lanes that enter the crossroad junction is called inward lanes, and lanes that leave the crossroad junction is called outward lane. It can be understood that a reference path in a crossroad junction should start from an inward lane and end at an outward lane. Furthermore, the reference path may assume a curved shape such as a semi-circular shape, a quasi-circular shape, a quadrant shape, a parabolic shape or any other suitable shapes, depending on the positions and orientations of the inward lane and the outward lane it connects. However, the reference path is used only as a reference, and in actual navigation, a vehicle may not strictly follow such reference path because the vehicle characteristics and the traffic may vary.

Similar to the reference path in lanes, the reference path in a crossroad junction may include waypoints. As a result, in certain embodiments, a complete reference path that can guide a vehicle driving from one lane to another through a crossroad junction includes a first section in an inward lane, a second section in an outward lane, and a third section connecting the first section and the second section. Each section comprises a sequence of waypoints that link to related navigation information and are conveyed to an autonomous vehicle to guide navigation. As illustrated in FIG. 4, reference path 302 and 311 can guide a vehicle driving from inward lane 211 to outward lane 234, and from inward lane 212 to outward land 233, respectively. Reference path 301 can guide a vehicle driving from inward lane 211 to outward lane 224 through a right turn. Reference path 312 can guide a vehicle driving from inward lane 212 to outward lane 243 through a left turn. Reference path 313 can guide a vehicle driving from inward lane 212 to outward lane 214 through a U turn.

In certain embodiments, the reference paths in a crossroad junction are generated automatically with certain image recognition algorithm, for example, when guide paths are actually painted on the ground surface of the crossroad junction. In certain embodiments, the reference paths in crossroad junction are generated by human operation that sends instruction to a computer processor to link the reference paths in the lane connecting to the crossroad junction. Preferably, the reference paths in a crossroad junction are generated in a way that allows a vehicle to drive through the crossroad junction smoothly. For example, in a reference path making a left-hand turn in the crossroad junction and connecting an inward lane and an outward lane, to avoid sharp change of driving direction and speed, the reference path is generated by taking consideration of not only the waypoints at the end of the inward lane and the outward lane, but also the waypoints within the inward and outward lanes, e.g., at least 1, 2, or 3 waypoints closest to the waypoints at the end of the inward and out ward lanes. As a result, the reference path in the crossroad junction is a smooth curve connecting the reference path in the inward and outward lanes, which allows an autonomous vehicle to make a left turn smoothly.

After some or all reference paths that go through a crossroad junction is generated, various navigation information and traffic properties need to be linked to the reference paths. The linkage of navigation information is critical for a reference path to guide an autonomous vehicle going through the crossroad junction. For example, a reference path that guide a vehicle making a turn needs to convey the related navigation information to the vehicle so that the vehicle can make proper operation, such as making turn signal. Notably, the navigation information related to making turn signal is different from the information related to controlling steering as a vehicle driving on a curved lane needs to adjust the steering but does not need to make a turn signal. Further, when guiding a vehicle making a turn at a crossroad junction, the reference path needs to convey to the vehicle to which area the vehicle needs to pay attention, i.e., taking the objects, e.g., vehicles and pedestrians, in that area into consideration when planning the trajectory of the vehicle. This is important for autonomous driving because while there may be numerous moving objects in a crossroad junction, taking all these objects into consideration when planning a trajectory can be computationally infeasible. Thus, the navigation information related to the area of interest in a crossroad junction allows an autonomous vehicle to plan its trajectory effectively. The linkage of navigation information and related traffic control indication with a reference path is not intuitive and may take tremendous human effort if generated by human operation. Therefore, in one aspect, the present disclosure provides a method of automatically linking related navigation information and traffic control indication to a reference path.

FIG. 5 illustrates an exemplary embodiment of methods for linking the related navigation information and traffic control indication to a reference path in a road connection region. Now referring to FIG. 5, a road map is provided and reference paths 301, 302, 311, 312, 313, each passing through crossroad junction 250, are generated according to the process described above.

A polygonal hub 400 is then generated to encompass the crossroad junction 250. As used herein, the term "encompass" when referring to the relationship between a polygonal hub and a crossroad junction means that the polygonal hub generally delineates the crossroad junction, i.e., the shape of the polygonal hub generally matches the shape of the crossroad junction. For example, a hub for a crossroad junction that connects to four roads can be quadrilateral. A hub for a crossroad junction that connects to five roads can be a pentagon. A hub for a three-way junction, i.e. a T-shape crossroad, can be quadrilateral. The polygonal hub should contain inside the crossroad junction and also certain neighboring regions in the lanes that connect to the crossroad junction. In particular, the polygonal hub contains regions and objects that are related to the navigation information necessary for guiding a vehicle driving through the crossroad junction, such as crosswalk regions, stop lines, stop signs, traffic lights, etc.

Referring to FIG. 5, hub 400 has a quadrilateral shape. It can be understood that depending on the shape of the crossroad junction, a hub can be triangle, a square, a rectangular, a pentagon, a hexagon, or a heptagon, etc. Hub 400 has four binders 401, 402, 403 and 404, each corresponding to a road connecting to the crossroad junction. It can be understood that in certain embodiments, the binders correspond to the sides of the hub. For example, a quadrilateral hub has four binders corresponding to four sides. A pentagon hub may have five binders corresponding to five sides of the pentagon. It can also be understood that in certain embodiments, not all sides of a polygonal hub are binders. For example, the hub of a three-way junction may be quadrilateral, and there are only three binders, each corresponding to a road connecting to the junction.

A polygonal hub can be generated automatically with certain image recognition algorithm based on the shape of the crossroad junction. Alternatively, a polygonal hub can be generated by human operation that sends instruction to a computer processor. In some embodiments, the polygonal hubs can be labelled by human operations based on the information of the original road map. In some other embodiments, the polygonal hubs can be automatically generated based on the original road map or the HD vector map with certain specific algorithms. For example, the polygonal hub 400 shown in FIG. 5 can be generated by expanding a substantial rectangle whose four edges follow respective crosswalks in the road connection region 200 by a predetermined ratio (e.g. 5%, 10%, 15%, 20%, 30% or 50%) or a predetermined length (e.g. 1 m, 2 m, 3 m, 5 m, 10 m or longer). In some other embodiments, the polygonal hub can be generated by connecting four edges at the four roads associated with the road connection region 200, wherein each edge may be positioned at a place on the corresponding road where one of the signs, lights or regions associated with navigation information or traffic control information that is farthest away from the center of the road connection region 200 is located.

In another example, the polygonal hub can be generated in the HD vector map using the following method. For example, the crossroad junction can be identified in the HD vector map where at least two reference paths meet (e.g. reference paths 301 and 302 meet at lane 211) or intersect with each other (e.g. reference path 312 may intersect another reference path from lane 231 to lane 214). Accordingly, the polygonal hub can be generated to cover all the adjacent reference paths that meet or intersect with each other. It can be understood that various other algorithms can be used as long as sufficient navigation and traffic control information associated with road connection regions can be encompassed by the polygonal hubs.

After the hub that encompasses the crossroad junction is generated, related navigation information and traffic control indication can be linked automatically to a reference path passing the crossroad junction.

First, the type of reference path is identified according to the geometrical relationship between the binders through which a reference path passes a crossroad junction. Now referring to FIG. 5, reference path 301 going from inward lane 211 to outward lane 224 can be generated by linking a part of binder 401 that intersects inward lane 211 with a part of binder 402 that intersects outward lane 224 in the cross road junction 250. Moreover, the shape of reference path 301 may be based on a difference in orientations of binders 401 and 402 (90 degrees in the example) and a distance therebetween. Accordingly, reference path 301 enters the crossroad junction 250 through binder 401 and leaves the crossroad junction 250 through binder 402. Reference path 301 is identified as a right turn based on the fact that binder 402 is on the right side of binder 401. Similarly, reference path 302 going from inward lane 211 to outward lane 234 can be generated by linking a part of binder 401 that intersects inward lane 211 with a part of binder 403 that intersects outward lane 234 in the cross road junction 250. Moreover, reference path 302 is substantially a straight line because the part of binder 401 that intersects inward lane 211 is opposite to the part of binder 403 that intersects outward lane 234. Accordingly, reference path 302 which is identified as a straight line enters the crossroad junction 250 through binder 401 and leaves the crossroad junction 250 through binder 403. In another instance, reference path 312 goes from inward lane 212 to outward lane 243. Reference path 312 enters the crossroad junction 250 through binder 401 and leaves the crossroad junction 250 through binder 404. Reference path 312 is identified as a left turn based on the fact that binder 404 is on the left side of binder 401. Reference path 313 goes from inward lane 212 to outward lane 214. Reference path 313 enters the crossroad junction 250 through binder 401 and leaves the crossroad junction 250 through binder 401. Reference path 313 is identified as a U-type turn based on the fact that it enters and leaves the crossroad junction both through binder 401.

In the second part, the areas to which a vehicle needs paying attention when driving through the crossroad junction are identified. Referring to FIG. 5, when a vehicle drives along reference path 301 to make a right turn, it needs to pay attention to walking cross regions 261 and 262. Walking cross regions 261 and 262 can be linked to reference path

301 automatically as reference path 301 crosses these two regions such that real-time navigation information associated with walking cross regions 261 and 262 can be provided to a vehicle when it actually drives along reference path 301. Similarly, reference path 302 can be linked automatically to walking cross regions 261 and 263. Reference 312 can be linked automatically to walking cross regions 261 and 264. Since the real-time navigation information may be generated during driving instead of map generating, data interfaces can be provided so that the vehicle navigation system can use such data interfaces to receive the real-time navigation information.

When a vehicle drives along reference path 301 to make a right turn, it may also need to pay attention to any vehicles driving from lanes 222, 231, 232 and/or 241, depending on the traffic light and traffic rule. The areas from which lanes 222, 231, 232 and/or 241 enter the crossroad junction 250 are then linked automatically with reference path 301 according to the geometrical relationship between the binders and the traffic rules. For example, it can be set that any right turn reference path needs to be linked with the entry area of the inward lanes that enter the crossroad junction across a binder that is on the right side, on the opposite side and on the left side of the binder from which the right turn reference path enters the crossroad junction. Similarly, reference path 312 can be linked automatically to the entry area of lanes 231 and 232. Reference path 313 can be linked automatically to the entry area of lanes 231, 232 and 241. In this way, the movement of vehicles or other objects in these areas can be monitored when an autonomous vehicle is driving following a reference path.

In the third part, traffic control indications can be further linked to reference path. For example, the traffic control indications may include traffic control lights, traffic control signs, traffic control bulletins or traffic control patterns (e.g. stop lines). Generally, the traffic control patterns are placed on the road surfaces and thus can be identified through processing the original road map. However, the traffic control lights, signs (e.g. stop signs, yield sign, route sign or the like) and bulletins (either electronic or non-electronic) generally stand on or hang above the road surface which may not be able to be identified through a plane view of the roads. In some embodiments, these traffic control objects and their respective positions in the road map can be identified through a street view of the roads. Referring to FIG. 5, reference path 301 is linked to traffic light 281 such that the signals displayed in the traffic control light 281 can be detected by a vehicle driving along the reference path 301, e.g., using a camera. Some other functional regions and traffic control objects can also be identified in the road map. For example, a railway region and adjacent traffic control lights are identified, which needs to be linked to a reference path that crosses the railway region.

In some embodiments, the traffic control indications can be generated based on the layout of the road connection regions, geometrical relationships between various roads of the road connection regions and predetermined traffic rules. The predetermined traffic rules may include, for example, stop or yield sign at each crosswalk region, traffic lights, etc. In a preferred example, multiple sets of predetermined traffic rules may be provided, each of which may be associated with a type of road connection region, e.g. a crossroad region or a T-shaped crossroad region. A set of predetermined traffic rules can be automatically applied to a polygonal hub previously generated for a road connection region based on, for example, the shape of the polygonal hub. In some embodiments, specific labels can be made to a polygonal hub by labelers to indicate inconsistency with the set of predetermined traffic rules applied for the hub. For example, the default set of traffic rules may not have left-turn traffic lights, and accordingly, one or more indications for indicating left-turn traffic lights can be labelled by labelers based on the original road map. In this way, the traffic control indications can be linked to a reference path automatically after a hub is generated. In some preferred embodiments, some of the traffic control indications that are contained in a hub are automatically linked to some or all of the reference paths that pass through the crossroad junction based on geometrical considerations and traffic rules. For example, if left turn traffic light indications are set for all roads in a road connection region like the crossroad junction shown in FIG. 5, then reference paths 312 and 313 may not be linked with a straight traffic light indication indicating whether the traffic from lanes 231 and 232 to lane 214 is permitted, because these traffics may not interfere with each other. However, if no left turn traffic light indications are set for all roads in the crossroad junction shown in FIG. 5, then reference paths 312 and 313 may be linked with a straight traffic light indication indicating whether the traffic from lanes 231 and 232 to lane 214 is permitted, because these traffics may interfere with each other. It can be understood various traffic control indications can be linked to the reference paths depending on the actual conditions which will not elaborated herein. In certain embodiments, the traffic control indications can be linked automatically to a reference path according to traffic control rules. For example, a stop line is linked to a reference path if the reference path crosses the stop line. In other words, certain traffic properties of waypoints of a reference path can be linked to the reference path. It can be understood that the linking process can be implemented by various technologies, for example, using a look-up table.

Figure 6:
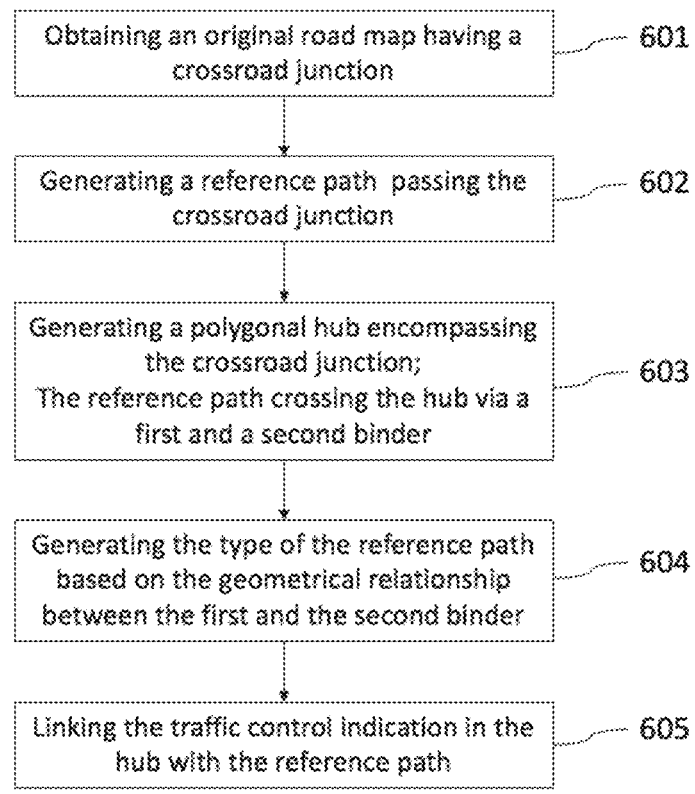
FIG. 6 illustrates a flow chart of the method according to an exemplary embodiment of the invention.

FIG. 6 illustrates a flow chart of an exemplary embodiments of the method for generating an HD vector map. Referring to FIG. 6, in the first step 601 of the method, an original road having a crossroad junction is obtained. In the step 602 of the method, a reference path is generated to pass the crossroad junction. In the step 603 of the method, a polygonal hub is generated to encompass the crossroad junction, wherein the reference path crosses the hub via a first binder and a third binder. In the step 604 of the method, the type of the reference path, e.g., a straight line, a right turn, a left turn, etc., is generated based on the geometrical relationship between the first and the second binder, e.g., whether the second binder is on the opposite side of the first binder, on the right side of the first binder, or on the left side of the first binder. Optionally, in the step 605 of the method, the traffic control indications within the hub, e.g. a stop sign, a stop line, a yield sign, a walking cross line and/or a traffic light, are linked to the reference path.

It can be understood that the order of certain steps illustrated in FIG. 6 may be altered in certain embodiments without changing the result of the method. For example, the polygonal hub generated in the step 603 may be generated before the generation of the reference path as illustrated in the step 602. In such case, a polygonal hub is generated to encompass the crossroad junction. Then a reference path passing the crossroad junction is generated to cross the hub via a first binder and a second binder.

The embodiments of the present application may be implemented by software or any other manner. The software may be stored in a memory and executed by appropriate instruction executing systems. For example, the software may be executed by a microprocessor or a specifically designed hardware. Those skilled in the art may understand that the previous method of the present application may be implemented by computer-executable instructions and/or control codes contained in the processor. For example, such codes may be provided in storage mediums such as hard disks, programmable memories such as ROM(s), or data mediums such as optical or electrical signal mediums.

Navigation Module

Figure 7:
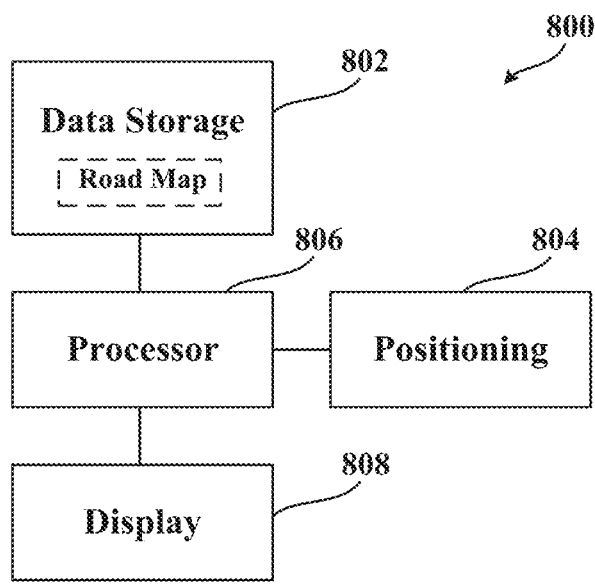
FIG. 7 illustrates a navigation module according to an embodiment of the application.

The HD vector maps generated according to the embodiments of the present application can be used in a navigation module. FIG. 7 illustrates a navigation module 800 according to an embodiment of the present application.

As shown in FIG. 7, the navigation module 800 includes a data storage 802 for storing an HD vector map for autonomous vehicle navigation. The HD vector map can be generated according to the embodiments of the application.

The navigation module 800 further includes a positioning module 804 for detecting a present position of a vehicle, and a processor 806. The processor 806 can be used to receive a destination of the vehicle, and calculate a route for the vehicle based on the road map, the present position of the vehicle and the destination of the vehicle. The destination of the vehicle can be input by a driver or passenger of the vehicle. The destination of the vehicle may be a coordinate point or a vector in a coordinate system of the road map. In some embodiments, the processor 806 may identify a vehicle position in the road map corresponding to the present position of the vehicle detected by the positioning module 804. For example, the vehicle position may be a coordinate point or a vector in the coordinate system of the road map, which is of a format the same as or similar to the destination of the vehicle. Afterwards, the processor 806 may further calculate the route for the vehicle which connects the vehicle position in the map and the destination of the vehicle. Data of the road map including the traffic properties of respective road segments can be used as constraints and costs in the computation of the route for the vehicle.

In some embodiments, the processor 806 can receive traffic information associated with the present position of the vehicle; and generate at least one driving control instruction based on the route and the traffic information. In this way, the vehicle can drive according to the at least one driving control instruction, without human driving operation. In some examples, the traffic information can be received from a communication module which forwards the traffic information from a remote server. In some other examples, the traffic information can be received from sensors carried on the vehicle, which detect other moving or non-moving objects on the road and generate corresponding measurement results.

In some embodiments, the navigation module 800 can further include a display 808 for displaying the present position of the vehicle and at least a portion of the HD vector map associated with the present position of the vehicle. For example, a visualization software module can be used to process the road map and the route to generate a visual representation such as a set of images or a video of the vehicle in the road map. The visual representation can be displayed by the display 808, such that the driver or passenger in the vehicle can be aware of the route or other information associated with the vehicle navigation based on the road map.

The navigation module 800 can be carried on an autonomous vehicle.

Those skilled in the art may understand and implement other variations to the disclosed embodiments from a study of the drawings, the disclosure, and the appended claims. In the claims, the word "comprising" does not exclude other elements or steps, and the indefinite article "a" or "an" does not exclude a plurality. In applications according to present application, one element may perform functions of several technical feature recited in claims. Any reference signs in the claims should not be construed as limiting the scope. The scope and spirit of the present application is defined by the appended claims.

What is claimed is:

1. A method for vehicle navigation, the method being executed by a processor and comprising:
    obtaining an original road map from a memory, wherein the original road map contains an image of a road network in a digital format and has
        a crossroad junction,
        an inward lane entering the crossroad junction, and
        an outward lane leaving the crossroad junction;
    generating a reference path capable of guiding a vehicle driving from the inward lane to the outward lane through the crossroad junction;
    performing an image recognition algorithm on the original road map to generate a polygonal hub that delineates a shape of the crossroad junction, wherein the polygonal hub is generated by expanding a polygon whose edges follow respective crosswalks in a road connection region by a predetermined ratio or a predetermined length, the reference path enters and leaves the polygonal hub by crossing a first binder and a second binder, respectively, and the first binder and the second binder correspond to a first side and a second side of the polygonal hub, respectively;
    generating automatically a type of the reference path based on a geometrical relationship between the first binder and the second binder;
    identifying an area within the polygonal hub where an object detection or a collision avoidance is necessary when driving through the crossroad junction;
    identifying a traffic control indication within the polygonal hub;
    linking the type of the reference path, the area within the polygonal hub and the traffic control indication within the polygonal hub with the reference path to generate a high definition (HD) vector map;
    obtaining a present position of a vehicle;
    obtaining a destination of the vehicle;
    calculating a route for the vehicle based on the HD vector map, the present position of the vehicle and the destination of the vehicle;
    receiving traffic information associated with the present position of the vehicle; and
    generating at least one driving control instruction based on the route and the traffic information, wherein the vehicle drives according to the at least one driving control instruction.

2. The method of claim 1, wherein the type of the reference path is a right turn when the second binder is on the right side of the first binder.

3. The method of claim 1, wherein the type of the reference path is a straight line when the second binder is on the opposite side of the first binder.

4. The method of claim 1, wherein the type of the reference path is a left turn when the second binder is on the left side of the first binder.

5. The method of claim 1, wherein the type of the reference path is a U-turn when the second binder is the same as the first binder.

6. The method of claim 1, wherein the polygonal hub is quadrilateral.

7. The method of claim 1, wherein the traffic control indication is selected from a stop sign, a stop line, a yield sign, a walking cross line and a traffic light.

8. The method of claim 1, wherein the reference path crosses the traffic control indication.

9. The method of claim 1, wherein the reference path comprises:
   a first section in the inward lane,
   a second section in the outward lane, and
   a third section connecting the first section and the second section.

10. The method of claim 9, wherein the reference path is generated by:
    identifying boundaries of the inward lane;
    generating the first section of the reference path based on the boundaries of the inward lane;
    identifying boundaries of the outward lane;
    generating the second section of the reference path based on the boundaries of the outward lane; and
    linking the first and the second sections to generate the third section of the reference path.

11. The method of claim 1, wherein the area is a walking cross region or a second inward lane.

12. The method of claim 11, wherein the type of the reference path is a right turn, and wherein the second inward lane enters the polygonal hub by crossing a binder that is on the right side of the first binder, on the opposite side of the first binder, or on the left side of the first binder.

13. The method of claim 11, wherein the type of the reference path is a left turn, and wherein the second inward lane enters the polygonal hub by crossing a binder that is on the opposite side of the first binder.

14. The method of claim 11, wherein the type of the reference path is a U turn, and wherein the second inward lane enters the polygonal hub by crossing a binder that is on the opposite side of the first binder.

15. The method of claim 11, wherein the reference path crosses the walking cross region.

16. The method of claim 1, wherein the reference path comprises a plurality of waypoints.

17. A non-transitory computer readable storage medium for storing a program of instructions that, when executed by a computer, cause the computer to perform the method of claim 1.

* * * * *